United States Patent [19]

Ishida

[11] Patent Number: 5,367,618
[45] Date of Patent: Nov. 22, 1994

[54] DOCUMENT PROCESSING APPARATUS

[75] Inventor: Koki Ishida, Hadano, Japan

[73] Assignee: Ricoh Company, Ltd., Tokyo, Japan

[21] Appl. No.: 725,604

[22] Filed: Jul. 3, 1991

[30] Foreign Application Priority Data

Jul. 4, 1990 [JP] Japan .................................. 2-175277

[51] Int. Cl.$^5$ ............................................. G06K 15/00
[52] U.S. Cl. .................................... 395/145; 395/110; 395/153
[58] Field of Search ............... 395/145, 153, 161, 110, 395/104

[56] References Cited

U.S. PATENT DOCUMENTS

| 4,811,242 | 3/1989 | Adachi | 395/110 X |
| 5,148,293 | 9/1992 | Miyachi | 395/110 |
| 5,167,013 | 11/1992 | Hube et al. | 395/110 X |
| 5,220,674 | 6/1993 | Morgan et al. | 395/110 X |

Primary Examiner—Heather R. Herndon
Assistant Examiner—Cliff N. Vo
Attorney, Agent, or Firm—Oblon, Spivak, McClelland, Maier & Neustadt

[57] ABSTRACT

A document processing apparatus with a transmitting unit and a receiving unit, the transmitting unit capable of making document data by using a plurality of font data sets, the receiving unit capable of outputting document data received from the transmitting unit. The apparatus includes a transmission part for transmitting the document data to the receiving unit by executing a given transmission control procedure, a first control part for selecting font data corresponding to character codes contained in the document data from among a font data set included in the font data sets when it is determined that the font data set is not installed in the receiving unit, and for transmitting the selected font data to the receiving unit. The apparatus further includes a second control part for temporarily storing the font data which is received from the transmitting unit and for allowing the receiving unit to output the document data by using the stored font data, so that graphic characters corresponding to the character codes contained in the outputted document data are defined by the font data.

8 Claims, 6 Drawing Sheets

FIG.4

| FONT DATA | FONT IDENTIFIER | NO. OF FONT DATA (m) | CHARACTER CODE #1 | FONT DATA #1 | CHARACTER CODE #2 | FONT DATA #2 | CHARACTER CODE #m | FONT DATA #m |
|---|---|---|---|---|---|---|---|---|

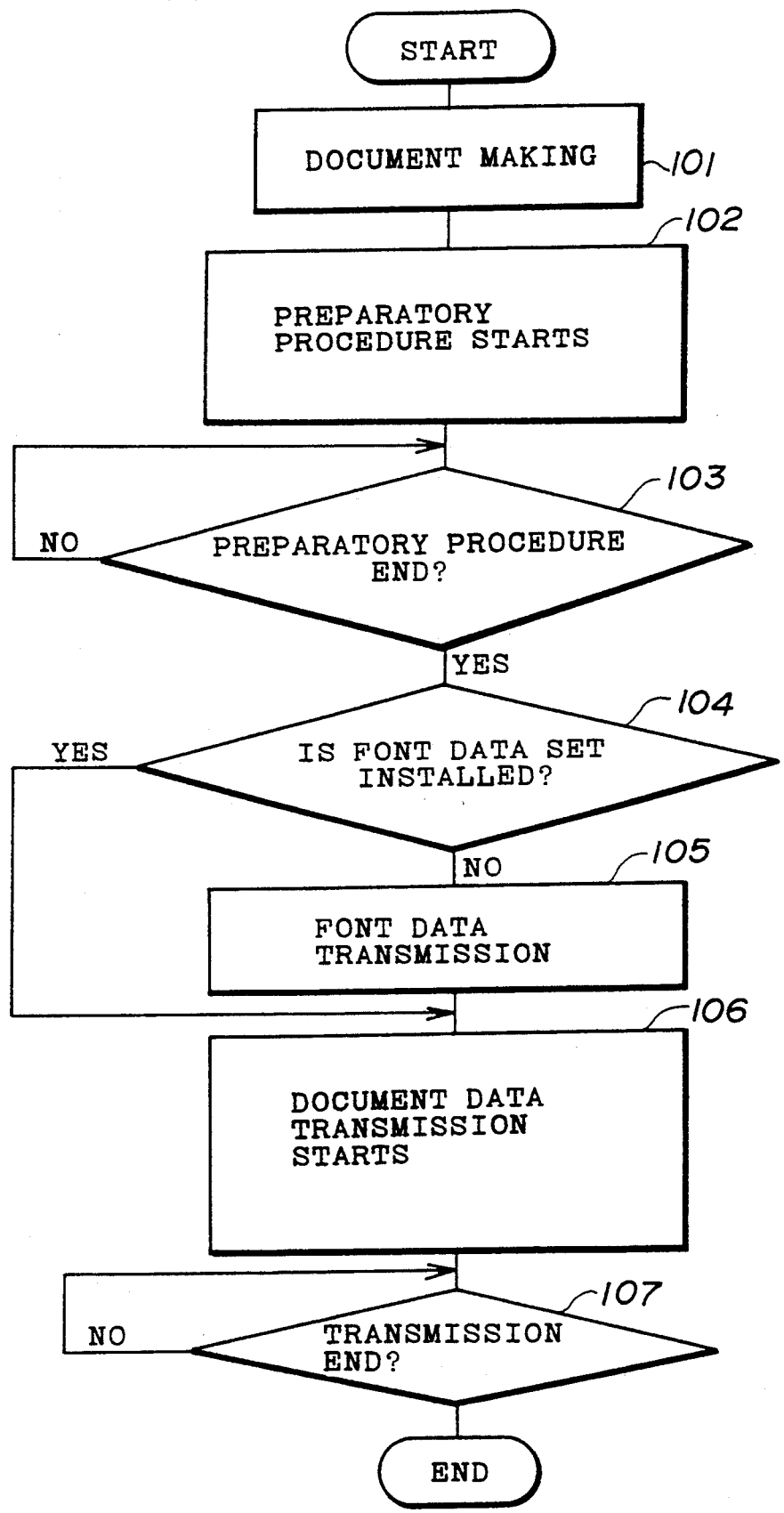

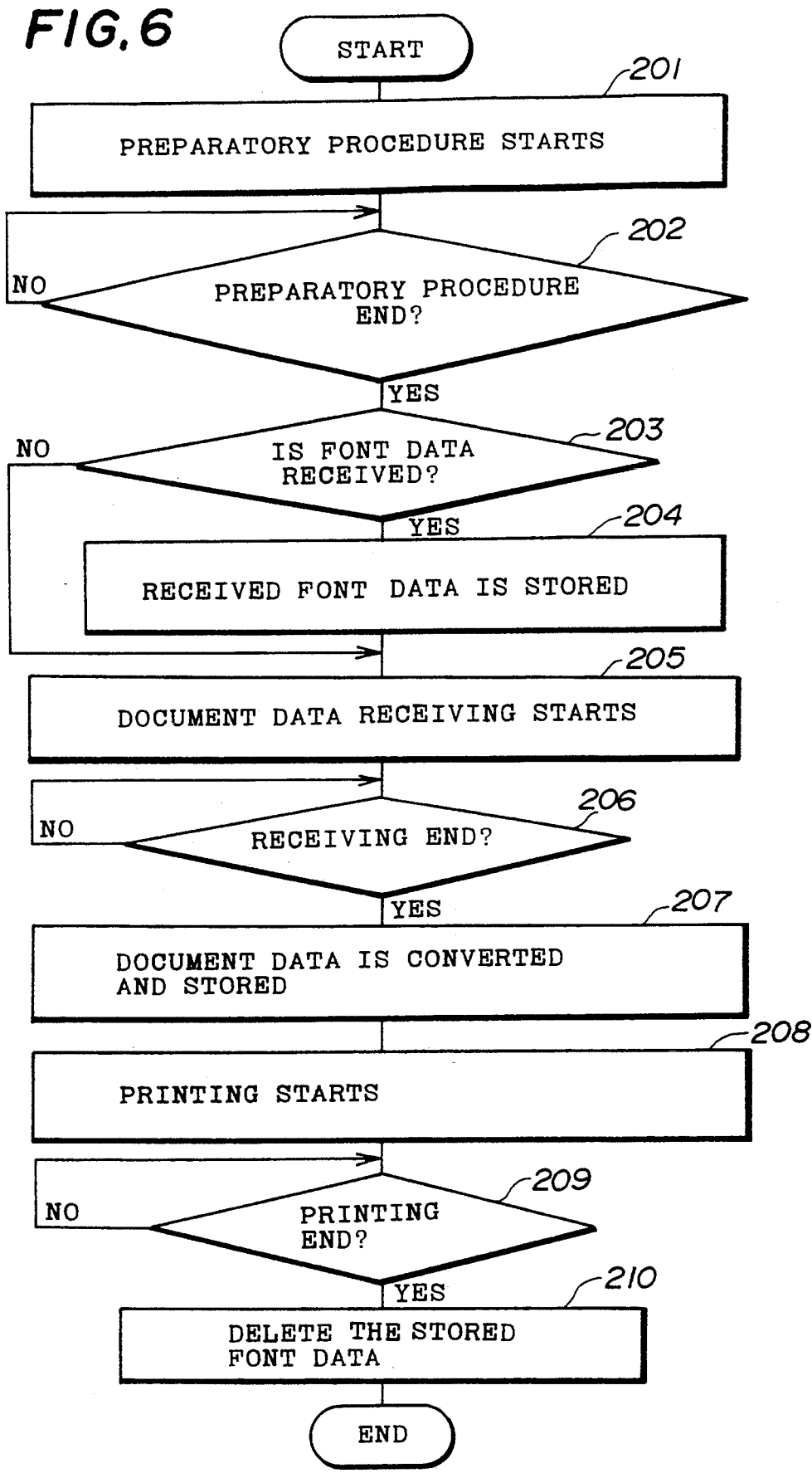

DOCUMENT PROCESSING APPARATUS

BACKGROUND OF THE INVENTION

The present invention generally relates to document processing apparatus, and more particularly to a document processing apparatus which is capable of making document data by using at least one of a plurality of font data sets.

Recently, a document processing apparatus like a wordprocessor, which is capable of making document data by using at least one of a plurality of sets of font data, has been put into practical use, and the capability of the document processing apparatus will enhance the appearance or quality of the document data thus prepared by the document processing apparatus. And, such document data that has been prepared by a transmitting unit, which is provided with the above document making capability using at least one of a plurality of sets of font data, are transmitted to a receiving unit via a data communication network by executing a predetermined data transmission procedure, so that the document data received from the transmitting unit is outputted by the receiving unit. However, in order to output the document data with no problem detrimental to the appearance or quality of the document data being elaborated with the transmitting unit, the receiving unit must be equipped with an output device (including a printer and a display) which is capable of using the same kind of font data that has been used by the transmitting unit, this font data being necessary for the receiving unit to output the document data in appropriate or human-intelligible form, particularly in outputting the graphic characters included in the document data. If the document data is transmitted to a receiving unit and the receiving unit is not equipped with the same kind of font data as that of the transmitting unit, there is a problem in that the received document data is outputted using a different font data by the output device of the receiving unit, the outputted document data often being not in appropriate form, so the appearance of the document data originally created with the document processing apparatus is not outputted appropriately.

SUMMARY OF THE INVENTION

Accordingly, it is a general object of the present invention to provide an improved document processing apparatus in which the above described problems of the conventional document processing apparatus are eliminated.

Another and more specific object of the present invention is to provide a document processing apparatus which allows the above receiving document processing unit to output the received document data in appropriate form. The above mentioned object of the present invention can be achieved by a document processing apparatus with a transmitting unit and a receiving unit, the transmitting unit being capable of making document data by using at least one of a plurality of font data sets, the receiving unit being capable of outputting document data received from the transmitting unit via a network, the apparatus comprising a transmission part for transmitting the document data, made by the transmitting unit, to the receiving unit via a network by executing a predetermined data transmission control procedure, a first control part for selecting font data corresponding to character codes contained in the document data from among a font data set, included in the plurality of font data sets and used by the transmitting unit in making the document data, when it is determined that the font data set is not installed in the receiving unit, and for transmitting the font data to the receiving unit via the network prior to the document data transmission performed by the transmission part, a second control part for temporarily storing the font data, in a storage device, which is received by the receiving unit from the first control part, and for allowing the receiving unit to output the document data by using the font data thus stored, after the document data is received by the receiving unit, so that graphic characters corresponding to the character codes contained in the outputted document data are defined by the received font data. According to the present invention, when the font data necessary for the receiving unit to output the received document data in appropriate form is not installed in the receiving unit, the font data is transmitted to the receiving unit and the received font data is stored in the memory part, thus allowing the receiving unit to print out the received document data in appropriate form with the stored font data. In addition, when the printing of the document data is completed, the font data received by the receiving unit and stored in the memory part is deleted, thus making efficient use of the storing capacity of the memory part.

Other objects and further features of the present invention will become more apparent from the following detailed description when read in conjunction with the accompanying drawings.

BRIEF DESCRIPTION OF THE DRAWINGS

FIG. 4 is a diagram showing a structure of font data which is transmitted to the receiving unit by the document processing apparatus;

FIG. 5 is a flow chart for explaining a data transmitting procedure which is executed by the document processing apparatus of the present invention; and FIG. 6 is a flow chart for explaining a data receiving procedure which is executed by the document processing apparatus of the present invention.

DESCRIPTION OF THE PREFERRED EMBODIMENT

Figure 1:
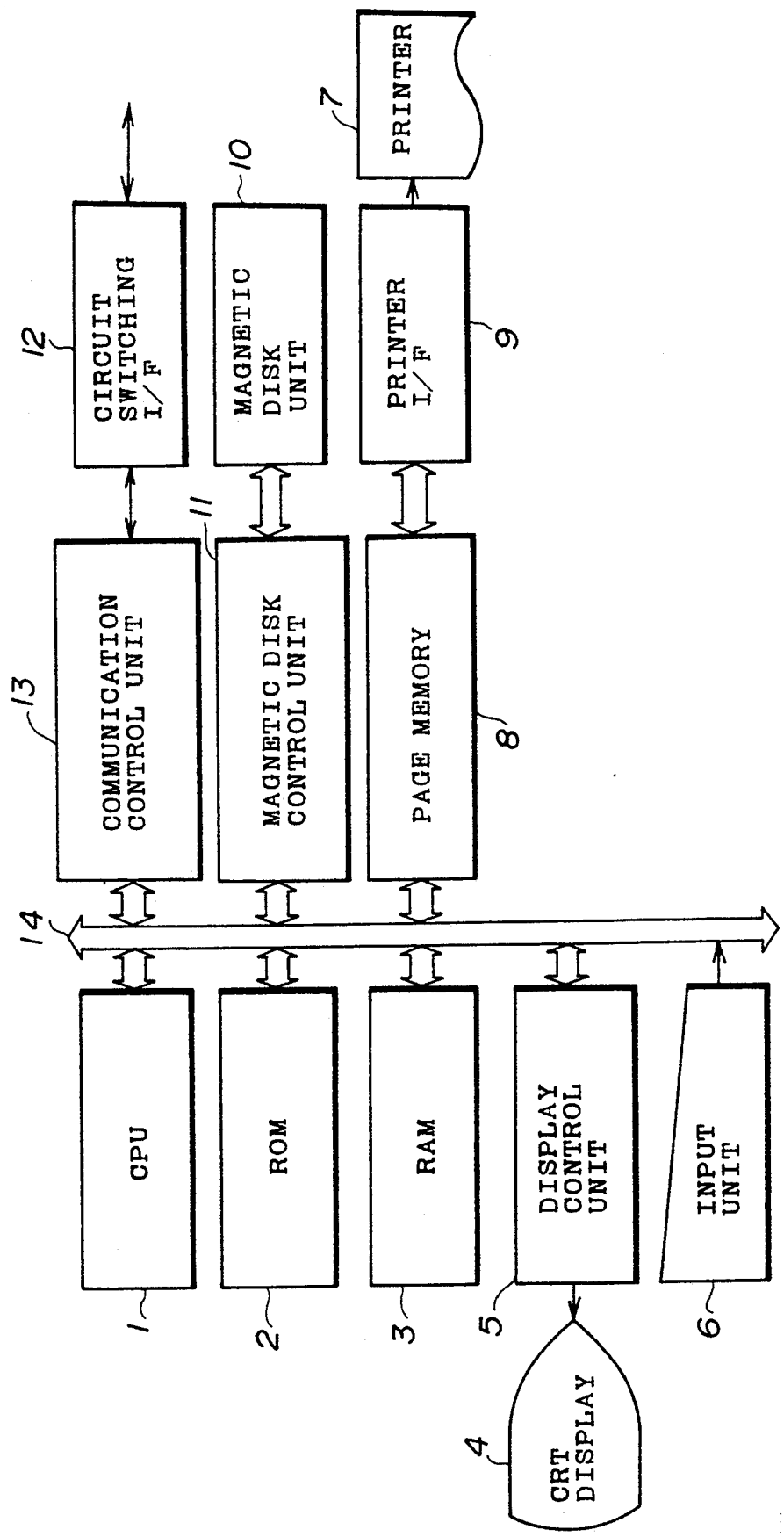
FIG. 1 is a block diagram showing an embodiment of a document processing apparatus according to the present invention.

First, a description will be given of an embodiment of a document processing apparatus according to the present invention, with reference to FIG. 1. In this document processing apparatus shown in FIG. 1, a central processing unit (CPU) 1 is a control part of the document processing apparatus which carries out several control procedures including document editing and making procedures in accordance with control programs. A read only memory (ROM) 2 is a memory part in which the control programs executed by the CPU 1 and several kinds of data necessary for the CPU 1 to execute the control programs. These data stored in the ROM 2 are, for example, a plurality of sets of font data which are used in outputting special graphic characters included in a document. A random access memory (RAM) 3 is used as a work area of the CPU 1 when the control programs are executed. A CRT display 4 is an output device with a display screen on which several kinds of information are displayed when the control programs are executed by the CPU 1. A display control unit 5 controls operations of the CRT display 4. An input part 6 is used by an operator to input user instructions to initiate any of several operations of the document processing apparatus.

The document data originally created with the document processing apparatus is converted into recording data, and the recording data is outputted by a printer 7 onto recording paper. A page memory 8 is a memory in which one page of the recording data to be outputted by the printer 7 is stored. The recording data into which the document data is converted is divided into pieces of data, each piece being the same size as a page and being supplied to the page memory 8, so that the page memory 8 can hold exactly one page of the recording data. Each page of the recording data in the page memory 8 is consecutively supplied to the printer 7 via a printer interface part 9, so that all of the pages are outputted by the printer 7 onto recording paper. A magnetic disk unit 10 is a storage device which is capable of storing magnetically a large amount of data such as document data prepared by the document processing apparatus. A magnetic disk control unit 11 controls the input/output operations of the magnetic disk unit 10.

A circuit switching interface part 12 serves to connect the document processing apparatus to a data communication network. A communication control unit 13 performs a calling control procedure to call a receiving terminal through the data communication network from the document processing apparatus as a transmitting terminal. This communication control unit 13 also performs a data transmission control procedure to carry out data transmission from one terminal to another via a data communication network. The CPU 1, the ROM 2, the RAM 3, the display control unit 5, the input unit 6, the page memory 8, the magnetic disk control unit 11 and the communication control unit 13 are interconnected by a bus 14, so that data is inputted or outputted between these units of the document processing apparatus via the bus 14.

Figure 2:
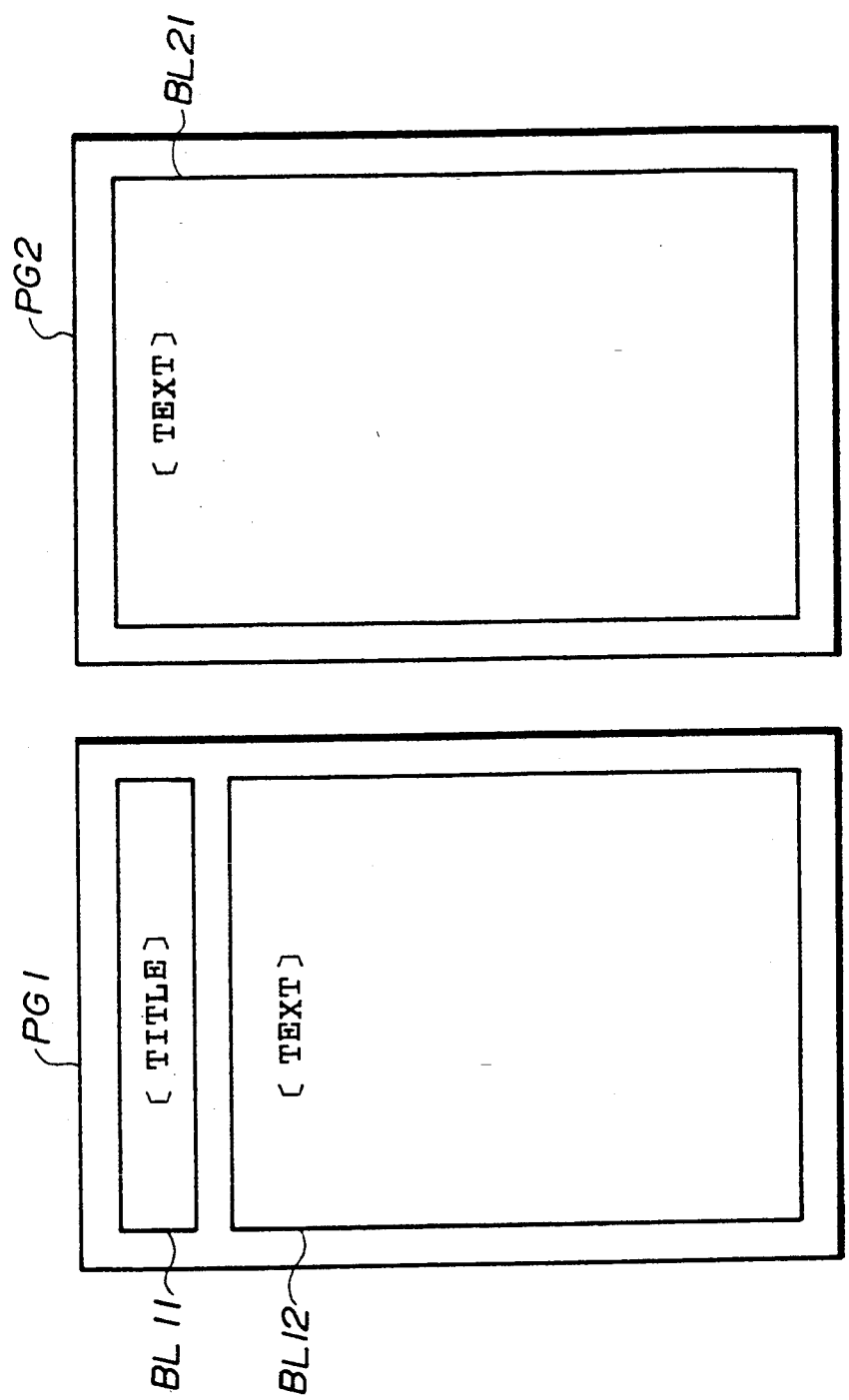
FIG. 2 is a diagram showing an example of a document which is created by the document processing apparatus of the present invention.

FIG. 2 shows an example of a document which is made by the document processing apparatus. This document shown in FIG. 2 is made up of two pages, a first page PG1 containing two blocks BL11 and BL12 and a second page PG2 containing a single block BL22. The block BL11 of the first page contains a title of the document which is inputted by using a special font data set, for example, a set of gothic letters, and the block BL12 of the first page and the block BL21 of the second page contain the text of the document which is written in a default font data set.

Figure 3:
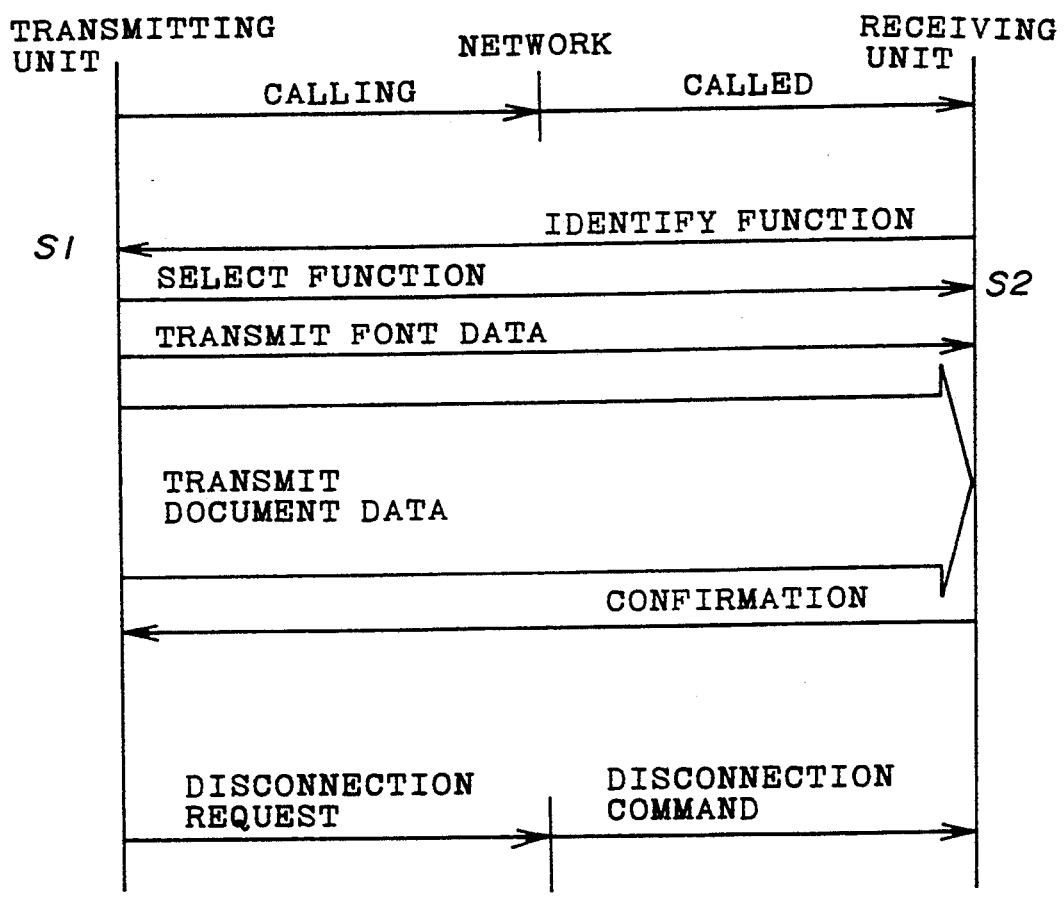
FIG. 3 is a timing chart for explaining a document data transmission procedure which is carried out by the document processing apparatus of the present invention to transmit document data to the receiving unit.

FIG. 3 shows a data transmission procedure which is executed by the document processing apparatus including a transmitting unit and a receiving unit, the transmitting unit being capable of making a document by using at least one of a plurality of sets of font data, the receiving unit capable of outputting document data received from the transmitting unit. The transmitting unit first sends a calling signal to a data communication network for calling the receiving unit as a destination terminal. The data communication network then transmits a signal to the destination terminal to notify the receiving unit that the call is received from the transmitting unit. This signal transmission enables a communication path to be established between the transmitting unit and the receiving unit.

Next, the receiving unit sends a function identification signal S1 back to the transmitting unit via the data communication network, notify what kinds of functions the receiving unit posses, including a terminal equipment function and a capability to use a special font data set, different from the default font data set. In accordance with the function identification signal S1 received from the receiving unit, the transmitting unit recognizes the functions the receiving unit has, and then it sends a function selection signal S2 to the receiving unit, indicating which function of the receiving unit be selected from among the functions thereof for communication between the transmitting unit and the receiving unit when transmitting the document data to the receiving unit.

If the font data, which is necessary for the receiving unit to output in appropriate form the graphic characters included in the document data transmitted, is not installed in the receiving unit, a limited number of font data, corresponding to the graphic characters used in the document data, is selected from the font data sets stored in the ROM 2, and only the thus selected font data is transmitted by the transmitting unit to the receiving unit. For example, a case in which the document data as shown in FIG. 2 is to be transmitted and the font data necessary to output the graphic characters (to be written in gothic font) used in the block BL11 of this document data in appropriate form is not installed in the receiving unit, is considered. In this case, according to the present invention, the transmitting unit of the document processing apparatus selects a limited number of gothic font data corresponding to the graphic characters used in the block BK11 of the document data, from the font data sets stored in the ROM 2, and transmits only the thus selected font data to the receiving unit.

With the font data being received from the transmitting unit, the receiving unit temporarily stores the received font data in the magnetic disk unit 10 of the document processing apparatus. Then, the transmitting unit executes a predetermined data transmission procedure so that the document data is transmitted to the receiving unit. The receiving unit then executes a predetermined data receiving procedure to receive the document data from the transmitting unit, and temporarily stores the received document data in the magnetic disk unit 10. When the end of the document data transmission is detected, the receiving unit sends a confirmation signal back to the transmitting unit, indicating that the document data transmission is safely completed.

After the document data transmission is ended, the transmitting unit, when the confirmation signal is received from the receiving unit, sends to the data communication network a disconnection request signal, requesting that the call to the receiving unit be disconnected from the network. With the disconnection request signal being received, the data communication network transmits a disconnection command signal to the receiving unit, informing of the disconnection of the receiving unit from the network. This signal transmission enables the communication path between the transmitting unit and the receiving unit to be terminated.

As described above, when the font data necessary for the receiving unit to output appropriately the graphic characters used in the document data transmitted is not installed in the receiving unit, the necessary font data is transmitted from the transmitting unit to the receiving unit. Therefore, it is possible for the receiving unit to output the received document data in appropriate form which is essentially the same as that being created with the transmitting unit.

FIG. 4 shows a representative structure of font data which is transmitted by the document processing apparatus according to the present invention. This font data set is made up of a data identifier denoting that this data is a font data, a font identifier denoting the kind of the font data, the number of font data indicating the number of characters of font data which is transmitted to a receiving unit, and several sets #1 through #m of character codes and font data, the character codes denoting the respective graphic characters and the font data for displaying the respective graphic characters. According to the present invention, only the font data corresponding to the graphic characters used in the document data is transmitted to a receiving unit, and therefore the quantity of font data that is transmitted can be reduced and the time required for transmission of the font data can also be reduced.

FIG. 5 shows an example of a data transmitting procedure which is carried out by the document processing apparatus of the invention. In this flow chart shown in FIG. 5, a step 101 performs a document making step to create document data to be transmitted. The document data in the present case contains character data or text data only. A step 102 starts a given preparatory procedure in which a receiving unit designated is called and a predetermined procedure is performed before the document data transmission, and this preparatory procedure is continued until the end of the preparatory procedure is detected in a step 103. When the end of the preparatory procedure is detected in the step 103, a step 104 makes a determination on whether the font data set, which is necessary for the receiving unit to output in appropriate form the graphic characters in the document data to be transmitted, is installed in the receiving unit. If the font data set is not installed in the receiving unit, then a step 105 selects the necessary font data from the font data sets stored in the ROM 2 and performs a font data transmission to transmit the selected font data to the receiving unit. A step 106 starts a document data transmission procedure in which the document data is transmitted to the receiving unit, and this document data transmission procedure is continued until the end of the document data transmission procedure is detected in a step 107. In this manner, the data transmission procedure is performed by the document processing apparatus.

FIG. 6 shows a data receiving procedure which is performed by the document processing apparatus of the present invention. When a call is received from the transmitting unit, a step 201, in the flow chart shown in FIG. 6, starts a given preparatory procedure in which a predetermined procedure is performed before the document data transmission, and this preparatory procedure is continued until the end of the preparatory procedure is detected in a step 202. When the end of the preparatory procedure is detected in the step 202, a step 203 makes a determination on whether the font data is received in the preparatory procedure in the step 201. If the font data is received by the receiving unit, then a step 204 stores the font data in the magnetic disk unit 10. A step 205 starts a document data receiving procedure in which the data of the document from the transmitting unit is received by the receiving unit, and this document data receiving procedure is continued until the end of the procedure is detected in a step 206. When the document data receiving procedure is ended, a step 207 converts the received document data into data in recording format for each of the pages of the document data on the basis of the font data stored in the ROM 2 and the font data stored in the document disk unit 10, to form the recording data to be outputted onto recording paper for each of the pages of the document data received, and the step 207 stores the thus formed recording data in the page memory 8. A step 208 starts a printing procedure in which the recording data stored in the page memory 8 is printed out for each of the pages of the document, and this printing procedure is continued until the end of the printing procedure is detected in a step 209. When the printing procedure is ended in the step 209, a step 210 deletes the font data which is received from the transmitting unit and stored in the magnetic disk unit 10. In this manner, the document data receiving procedure is carried out by the document processing apparatus.

In the above embodiment, a case in which document data containing characters only is created by the document processing apparatus has been described. However, it is a matter of course that the present invention is also applicable to a document processing apparatus which is capable of making document data containing test data and picture data.

As described above, according to the present invention, when the font data necessary for a receiving unit to output the document data received is not installed in the receiving unit, the font data necessary can be transmitted to the receiving unit and the received font data can be stored in a storage device, allowing the receiving unit to print out the received document data in appropriate form. In addition, when the printing of a set of document data is ended, the font data received by the receiving unit and stored in the storage device is deleted, thus making efficient use of the storing capacity of the storage device.

Further, the present invention is not limited to the above described embodiment, and variations and modifications may be made without departing from the scope of the present invention.

What is claimed is:

1. A document processing apparatus comprising:
   a transmitting unit and a receiving unit, the transmitting unit being capable of making document data by using at least one of a plurality of font data sets, the receiving unit being capable of outputting document data received from the transmitting unit;
   transmission means for transmitting the document data, being made by the transmitting unit, to the receiving unit via a public communication line;
   first control means provided in said transmitting unit, said first control means performing a preparatory procedure prior to transmission of the document data, and wherein during said preparatory procedure a response protocol message is received by said transmitting unit via said public communication line, and based on the received protocol message said first control means determines whether the font data required by the receiving unit can be supplied locally from within the receiving unit, and wherein said first control means selects font data corresponding to character codes contained in the document data from a font data set, included in the plurality of font data sets and used by the transmitting unit in making the document data in response to a determination that said font data set is not installed in the receiving unit after said preparatory procedure and thereafter said transmitting unit transmits said font data to the receiving unit via the public communication line prior to said document data transmission performed by said transmission means; and second control means provided in said receiving unit for temporarily storing said font data which is received by the receiving unit from the first control means in a storage device, and said second control means allowing the receiving unit to output said document data by using said font data stored in said storage device, after said document data is received by the receiving unit, so that graphic characters corresponding to said character codes contained in the outputted document data are defined by the received font data.

2. The apparatus as claimed in claim 1, wherein said second control means deletes the received font data, which is stored in the storage device, after the received document data is outputted by the receiving unit.

3. The apparatus as claimed in claim 1, wherein the transmitting unit receives a function identification signal sent by the receiving unit after a communication path is established between the transmitting unit and the receiving unit, said function identification signal being indicative of whether said font data set is installed in the receiving unit or not.

4. The apparatus as claimed in claim 1, wherein said second control means comprises a magnetic disk unit provided within the receiving unit as said storage device, said font data transmitted by said first control means to the receiving unit being stored in said magnetic disk unit for use when the document data is outputted by said second control means.

5. The apparatus as claimed in claim 1, wherein said second control means includes a memory part which is provided within the receiving unit for storing the document data which is transmitted by said transmission means to the receiving unit, the document data stored in said memory part being outputted by the receiving unit with said font data stored in said storage device.

6. The apparatus as claimed in claim 1, wherein the receiving unit receives a function selection signal sent by the transmitting unit after a communication path is established between the transmitting unit and the receiving unit, said function selection signal being indicative of which function of the receiving unit is selected by the transmitting unit.

7. The apparatus as claimed in claim 3, wherein the receiving unit receives a function selection signal sent by the transmitting unit after a communication path is established between the transmitting unit and the receiving unit, said function selection signal being indicative of which function of the receiving unit is selected by the transmitting unit.

8. The apparatus as claimed in claim 4, wherein said second control means further comprises a memory part which is provided within the receiving unit for storing the document data which is transmitted by said transmission means to the receiving unit, the stored document data in said memory part being outputted by the receiving unit with the stored font data.

* * * * *